(12) United States Patent
Amano

(10) Patent No.: US 9,416,860 B2
(45) Date of Patent: Aug. 16, 2016

(54) VIBRATION DAMPING DEVICE

(75) Inventor: Hiroyuki Amano, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/362,332

(22) PCT Filed: Feb. 29, 2012

(86) PCT No.: PCT/JP2012/055031
§ 371 (c)(1),
(2), (4) Date: Jun. 2, 2014

(87) PCT Pub. No.: WO2013/128590
PCT Pub. Date: Sep. 6, 2013

(65) Prior Publication Data
US 2014/0374207 A1    Dec. 25, 2014

(51) Int. Cl.
*F16H 45/02* (2006.01)
*F16F 15/14* (2006.01)
*F16D 33/18* (2006.01)
*F16F 7/10* (2006.01)

(52) U.S. Cl.
CPC ............... *F16H 45/02* (2013.01); *F16D 33/18* (2013.01); *F16F 7/1028* (2013.01); *F16F 15/145* (2013.01); *F16H 2045/0226* (2013.01); *F16H 2045/0252* (2013.01); *F16H 2045/0263* (2013.01)

(58) Field of Classification Search
CPC ............... F16F 15/1213; F16F 15/131; F16F 15/13128; F16F 15/1202; F16F 15/145; F16F 15/1457

USPC .................. 192/3.29; 74/574.2; 464/68.8
See application file for complete search history.

(56) References Cited

U.S. PATENT DOCUMENTS

| | | | | |
|---|---|---|---|---|
| 4,526,260 A | * | 7/1985 | Schierling | 192/201 |
| 5,355,747 A | * | 10/1994 | Kajitani | F16F 15/13484 |
| | | | | 192/208 |
| 5,386,896 A | * | 2/1995 | Matsuoka | F16F 15/167 |
| | | | | 188/277 |
| 5,513,731 A | | 5/1996 | Matsuoka | |
| 6,050,380 A | * | 4/2000 | Peinemann et al. | 192/55.4 |
| 6,059,082 A | * | 5/2000 | Fitzpatrick-Ellis et al. | 192/3.29 |
| 2001/0007383 A1 | * | 7/2001 | Schmid | 267/286 |
| 2009/0152066 A1 | * | 6/2009 | Degler et al. | 192/3.29 |
| 2010/0236228 A1 | | 9/2010 | Degler et al. | |

(Continued)

FOREIGN PATENT DOCUMENTS

JP   A-6-174049   6/1994
JP   A-11-311309  11/1999

(Continued)

*Primary Examiner* — Robert Hodge
*Assistant Examiner* — Stacey Fluhart
(74) *Attorney, Agent, or Firm* — Oliff PLC

(57) ABSTRACT

A vibration damping device which can improve a vibration damping performance of a damper having a chamber holding a rolling member. The vibration damping device is applied to a power transmission unit having an input side rotary member that transmits a power to an elastic member and an output rotary member that is rotated by the power transmitted from the elastic member. In order to damp vibrations of the output rotary member, the vibration damping device is comprised of a holding chamber rotated integrally with the input side rotary member and a rolling member held in the holding chamber in a manner to rotate in a same direction as the output side rotary member while being allowed to rotate relatively therewith.

5 Claims, 2 Drawing Sheets

(56) References Cited

U.S. PATENT DOCUMENTS

| | | | |
|---|---|---|---|
| 2010/0269497 A1 | 10/2010 | Engelmann et al. | |
| 2010/0276243 A1* | 11/2010 | Arhab et al. | 192/3.29 |
| 2012/0255825 A1* | 10/2012 | Ochi | F16H 45/02 192/3.29 |

FOREIGN PATENT DOCUMENTS

| | | |
|---|---|---|
| JP | A-2007-255636 | 10/2007 |
| JP | A-2010-255853 | 11/2010 |
| JP | A-2011-504986 | 2/2011 |
| JP | A-2011-208774 | 10/2011 |

* cited by examiner

VIBRATION DAMPING DEVICE

TECHNICAL FIELD

This invention relates to a vibration damping device for reducing torsional vibrations, and especially to a vibration damping device comprising a rotary member rotated by torque and a rolling member held in the rotary member while being allowed to rotate relatively with the rotary member.

BACKGROUND ART

A rotary member such as a drive shaft, gear and so on used to transmit a torque from a prime mover to a desired portion or a member is vibrated inevitably by a pulsation of the torque or load, or by a friction. A frequency of the vibration is varied according to rotational speed, and high order vibrations such as secondary vibrations are also generated. Therefore, amplitude of vibrations is widened by resonance. As a result, noise is generated and durability of the rotary member is degraded. Examples of a device or mechanism for suppressing such vibrations of equipment for transmitting power by rotation is disclosed in Japanese Patent Laid-Opens Nos. 2010-255853, 11-311309 and 2011-208774.

Japanese Patent Laid-Open No. 2010-255853 describes a torque converter for suppressing a pulsation of a torque from the prime mover, which is arranged on a transmission route of a power from a turbine runner. The torque converter taught by Japanese Patent Laid-Open No. 2010-255853 is comprised of an elastic damper that reduces vibrations by an elastic action of a spring, and a pendulum absorber arranged on a rotary member of an output side of the pendulum absorber. According to the teachings of Japanese Patent Laid-Open No. 2010-255853, torque is transmitted from an output disc connected with the turbine runner to a center housing trough the spring. The center housing is connected with an output shaft and is adapted to be rotated relatively with the turbine runner. In addition, a rolling member is arranged on an outer circumferential side of the center housing while being allowed to oscillate in a circumferential direction of the center housing. According to the teachings of Japanese Patent Laid-Open No. 2010-255853, therefore, the pulsation of the torque from the turbine runner is damped by the elastic damper, and the torque pulse propagated to the center housing is absorbed by the pendulum absorber.

Meanwhile, Japanese Patent Laid-Open No, 11-311309 describes a torque converter comprised of an elastic damper and a pendulum damper. According to the teachings of Japanese Patent Laid-Open No. 11-311309, the pendulum chamber is formed by depressing the end part wall of the converter cover so that the rolling member held therein is allowed to oscillate to suppress the vibrations. In order to lubricate a contact face between the depressed wall and the rolling member oscillating thereon, the oil delivered to the torque converter is applied to the recessed part. In the torque converter taught by Japanese Patent Laid-Open No. 11-311309, the elastic damper suppresses the torque pulse in the power transmitting route from the lockup clutch of the torque converter to the output shaft. Accordingly, the torque pulse transmitted from the prime mover is damped by the pendulum damper, and when the lockup clutch is engaged, the vibrations are suppressed utilizing the elasticity of the elastic damper by transmitting the power inputted to the lockup clutch to the output shaft through the elastic damper.

In turn, Japanese Patent Laid-Open No. 2011-208774 describes a vibration reducing device adapted to suppress pulsation of a torque transmitted from an engine to a torque converter by an elastic damper and a pendulum damper. Specifically, the elastic damper is comprised of a holder rotated integrally with a crank shaft, and a plate to which the power is transmitted from the holder through a spring. Meanwhile, the pendulum damper is comprised of a rolling chamber formed by a rotary member and the plate integrated therewith, and a rolling member held in the rolling chamber while being allowed to oscillate therein. Thus, the vibration reducing device taught by Japanese Patent Laid-Open No. 2011-208774 the torque pulses inputted to the torque converter by the elastic damper and the pendulum damper.

In order to downsize the torque converter, it is preferable to arrange the pendulum damper for suppressing the torque pulse inside of the torque converter. For example, provided that the pendulum damper taught by Japanese Patent Laid-Open No. 2010-255853 is arranged in the torque converter, or that the pendulum damper taught by Japanese Patent Laid-Open No. 11-311309 is employed, the rolling member of the pendulum damper would be soaked by the oil. Therefore, number of oscillations of the rolling member may be changed by viscosity resistance of the oil or by a change in the viscosity resistance depending on an alteration of temperature. Consequently, vibration reducing performance of the damper might be degraded.

The vibration dampening performance of the pendulum damper is changed depending on a mass ratio of the rolling member to the rotary member. Specifically, the vibration dampening performance is improved by increasing a mass of the rolling member to be relatively larger than that of the rotary member. Therefore, if a housing holding the rolling member is integrated with the rotary member whose vibrations are damped by the pendulum damper, as taught by Japanese Patent Laid-Open No. 11-311309, the mass of the housing is added to the mass of the rotary member. Consequently, the mass ratio of the rolling member to the rotary member is reduced to degrade the vibration dampening performance.

DISCLOSURE OF THE INVENTION

The present invention has been conceived noting the above-explained technical problems, and an object of the present invention is to improve a vibration damping performance of a damper of a vibration damping device having a chamber holding a rolling member.

The vibration damping device of the present invention is applied to a power transmission unit having an input side rotary member that transmits a power to an elastic member, and an output rotary member that is rotated by the power transmitted from the elastic member. In order to damp vibrations of the output rotary member, the vibration damping device is provided with a holding chamber that is rotated integrally with the input side rotary member, and a rolling member that is held in the holding chamber in a manner to rotate in a same direction as the output side rotary member while being allowed to rotate relatively therewith.

Specifically, the input side rotary member includes a covering member of a hydraulic transmission adapted to transmit power by a flow of fluid, and the output side rotary member includes a member rotated integrally with a driven side members rotated by the flow of the fluid. Meanwhile, the holding chamber is formed inside of the covering member, and sealed by a sealing member so as to prevent the fluid rotating the driven side member from entering into the holding chamber.

The input side rotary member further includes a lockup clutch that transmits a torque inputted to the hydraulic transmission mechanically to an output member of the hydraulic transmission.

The lockup clutch is engaged with the rolling member while being allowed to reciprocate toward and away from the holding chamber.

The input side rotary member further includes an input side plate and an output side plate being opposed to each other in an axial direction. In addition, the lockup clutch is splined at least to any of an outer circumferential face of the input side plate and an outer circumferential face of the output side plate.

According to the present invention, the power is transmitted from the input side rotary member to the output side rotary member through the elastic member. Therefore, pulsations of the torque transmitted to the output side rotary member can be suppressed by an elastic action of the elastic member. As described, the rolling member is held in the holding chamber in a manner to rotate in a same direction as the output side rotary member while being allowed to rotate relatively with the output side rotary member. Therefore, the holding chamber is rotated integrally with the member of the input side of the elastic member so that a mass of the rotary member whose vibrations are damped by an oscillating motion of the rolling member is reduced. As a result, the mass of the rolling member may become larger than that of the rotary member whose vibrations are damped by the oscillating motion of the rolling member. Therefore, the vibration damping performance of the oscillating rolling member is enhanced. In addition, since the mass of the holding chamber is added to the mass of the rotary member of the input side of the elastic member, an inertia moment of the rotary member of the input side of the elastic member can be increased. For this reason, vibration damping performance of the input side rotary member serving as a mass damper can be enhanced.

As also described, the holding chamber is formed inside of the covering member of the hydraulic transmission, and the holding chamber is sealed by the sealing member so as to prevent the fluid from entering into the holding chamber. Therefore, an inner space of the holding chamber can be maintained in a dry condition so that the oscillating motion of the rolling member will not be impaired by viscosity resistance of the fluid. For this reason, the vibrating dampening performance of the oscillating rotary member will not be deteriorated. In addition, number of oscillations per rotation of the rolling member will not be changed.

BEST MODE FOR CARRYING OUT THE INVENTION

Figure 1:
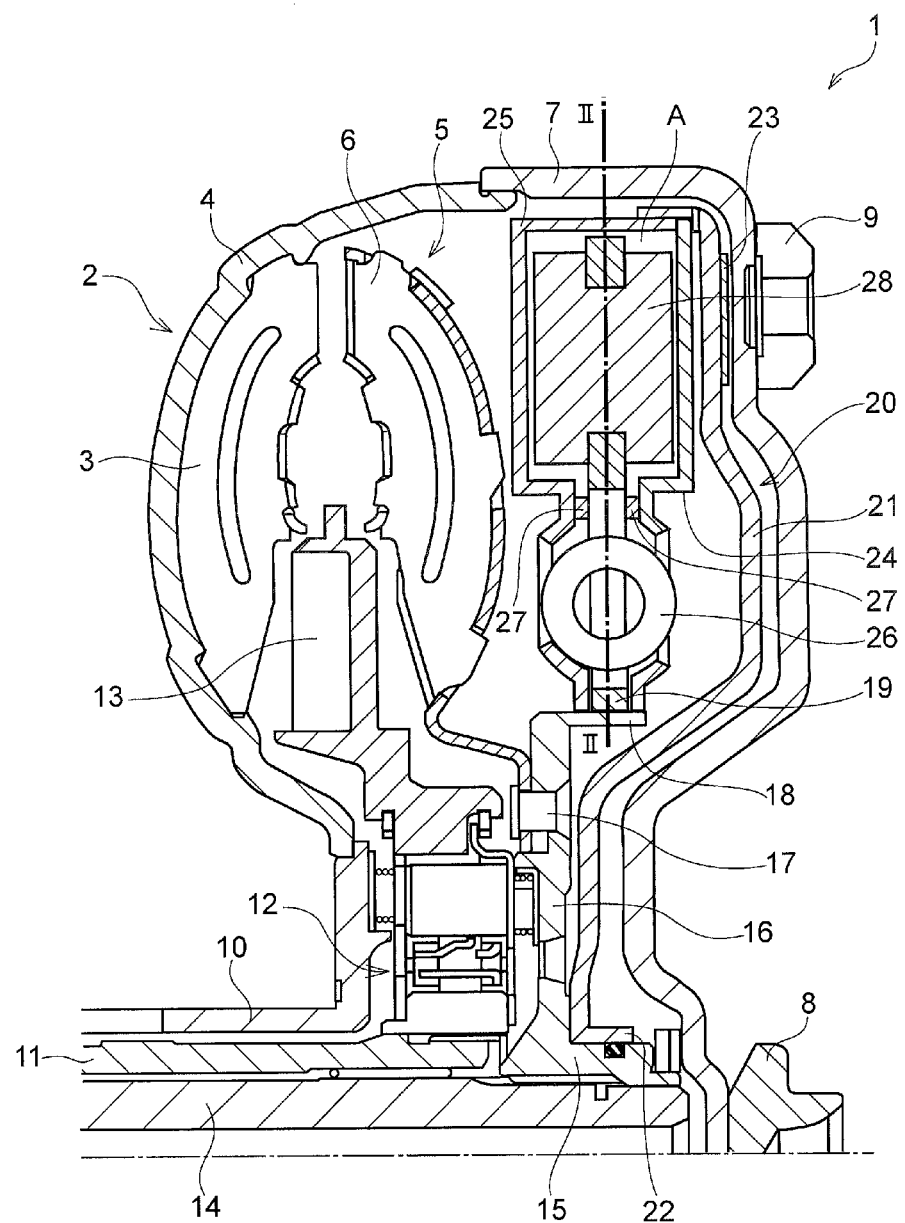
FIG. 1 is a partial sectional view showing upper half of an example of the vibration damping device according to the present invention above a rotational center axis.

Next a preferred example of the vibration damping device of the present invention will be explained in more detail. Referring now to FIG. 1, there is shown an example in which the vibration damping device is arranged in a torque converter 1 as a hydraulic transmission adapted to amplify a torque. The torque converter 1 shown therein is structured as a conventional torque converter widely used in vehicles. Specifically, a plurality of pump blades 3 is arranged radially on an inner face of a pump shell 4 of a pump impeller 2 as an input side member, and a turbine runner 5 is arranged to be opposed the pump impeller 2. A configuration of the turbine runner 5 is substantially symmetrically with that of the pump impeller 2, and a plurality of turbine blades 6 is arranged radially on an inner face of an annular (or semitorus-shape) shell. Thus, the pump impeller 2 and the turbine runner 5 are arranged coaxially while being opposed to each other.

A front cover 7 covering the turbine runner 5 from outside is joined integrally with an outer circumferential end of the pump shell 4. As shown in FIG. 1, the front cover 7 is a bottomed-cylindrical member comprising a front wall facing to the inner face of the pump shell 4, and oil is encapsulated inside of the front cover 7. The pump impeller 2 is rotated by the power transmitted thereto, and the turbine runner 5 is rotated to transmit the power by an oil flow in the front cover 7 resulting from rotating the turbine runner 5. A cylindrical member 8 is formed in the center of the front cover 7 to protrude outwardly from the front cover 7, and a not shown output shaft of an engine is inserted into the cylindrical member 8. To this end, the front cover 7 is fixed with a not shown drive plate that is rotated integrally with the output shaft of the engine, at a plurality of outer circumferential portions by a plurality of nuts 9. Therefore, the front cover 7 is rotated together with the drive plate by the power from the output shaft.

A cylindrical shaft 10 is joined integrally with an inner circumferential end of the pump shell 4. The cylindrical shaft 10 extends toward a back side (i.e., toward an opposite side of the engine), and connected with an oil pump not shown. In addition, a fixed shaft 11 is inserted into the cylindrical shaft 10. Specifically, an outer diameter of the fixed shaft 11 is smaller than an inner diameter of the cylindrical shaft 10, and a leading end portion of the fixed shaft 11 is inserted into an inner space of the torque converter 1 enclosed by the pump shell 4 and the front cover 7.

More specifically, the leading end portion of the fixed shaft 11 is situated at an inner circumferential side of the turbine runner 5 between the pump impeller 2 and the turbine runner 5, and splined to an inner race of a one-way clutch 12. In addition, a stator 13 is arranged between an inner circumferential portion of the pump impeller 2 and an inner circumferential portion of the turbine runner 5, and the stator 13 is fitted onto an outer race of the one-way clutch 12. Therefore, provided that a ratio between a speed of the pump impeller 2 and a speed of the turbine runner 5 is small, a rotation of the stator 13 can be stopped by the one-way clutch 12 even if the oil flowing out of the turbine runner 5 acts on the stator 13. As a result, a flowing direction of the oil is changed to a direction to deliver the oil to the pump impeller 2. By contrast, provided that the ratio between the speed of the pump impeller 2 and the speed of the turbine runner 5 becomes large, the oil is poured to a back face of the stator 13. In this situation, therefore, the stator 13 is rotated in order not to disturb the flow of the oil.

An output shaft 14 (i.e., an input shaft of not shown transmission) is inserted into the fixed shaft 11 in a rotatable manner. A leading end portion of the output shaft 14 protrudes from the leading end of the fixed shaft 11 to the vicinity of an inner face of the front cover 7 so that the protruding portion of the output shaft 14 is splined to a hub shaft 15. On the hub shaft 15, a flange-shaped hub 16 is formed to protrude outwardly to be connected integrally with the turbine runner 5 by a rivet 17.

A cylindrical portion 18 is formed by bending the outer circumferential portion of the hub 16 toward the engine side, and an annular center plate 19 serving as the output side rotary member of the invention is attached to an outer circumferential face of the cylindrical portion 18. Specifically, the center plate 19 has a hole in its center and fitted onto the cylindrical portion 18.

A lockup clutch 20 is fitted onto the hub shaft 15 between the hub 16 and the front cover 7. As the conventional lockup clutch, the lockup clutch 20 is adapted to reciprocate in an axial direction depending on a pressure difference between front and rear faces of a piston thereof. Specifically, the lockup clutch 20 is comprised of an annular lockup piston 21, a hub portion 22 formed by bending an inner circumferential portion of the lockup piston 21 toward the engine to be fitted onto the hub shaft 15 while being allowed to rotate relatively with the hub shaft 15, and a friction plate 23 formed on an outer circumferential side of an outer surface of the lockup piston 21 being opposed to the front cover 7. The lockup piston 21 is moved toward the front cover 7 by lowering an oil pressure between the lockup piston 21 and the front cover 7 so that the friction plate 23 is contacted with the inner face of the front cover 7. Consequently, the lockup piston 21 is physically connected with the front cover 7 to transmit the power inputted to the front cover 7 directly to the lockup piston 21. The lockup clutch 20 is engaged when a ratio between an input speed and an output speed of the torque converter 1 is "1", that is, the lockup clutch 20 is engaged under the condition that the vehicle having the torque converter 1 is driven steadily.

An annular input side plate 24 is attached to a surface of the center plate 19 facing to the engine, and a bottomed-cylindrical output side plate 25 is attached to a surface of the center plate 19 facing to the turbine runner 5. Thus, the input side plate 24 and the output side plate 25 are situated across the center plate 19. In order to close an opening of the output side plate 25, an outer circumferential end of the input side plate 24 is connected with an outer circumferential end of the output side plate 25. Both of the input side plate 24 and the output side plate 25 thus integrated are fitted onto the cylindrical portion 18 while being allowed to rotate relatively therewith. Therefore, the input side plate 24 and output side plate 25 are rotated integrally while being allowed to rotate relatively with the center plate 19. Accordingly, the input side plate 24 and output side plate 25 serve as the input side rotary member of the present invention, and also serve as a housing for holding an after-mentioned rolling member 28 therein.

Figure 2:
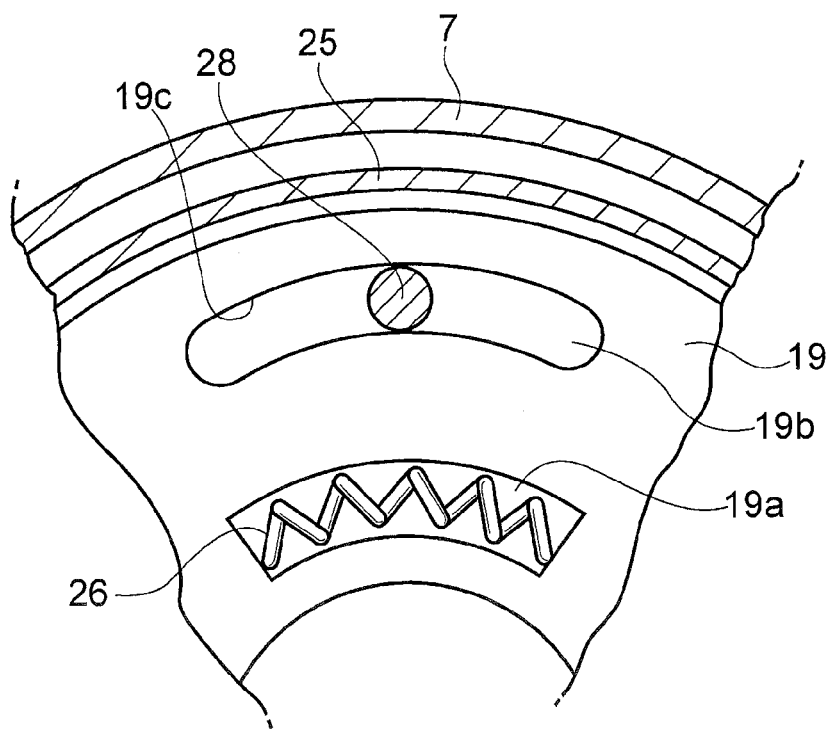
FIG. 2 is a sectional view showing a cross-section along II-II line in FIG. 1.

A housing hole 19a is formed by individually penetrating the center plate 19, the input side plate 24, and output side plate 25 in an axial direction at the same radial positions, and as shown in FIG. 2, a spring 26 that is compressible and stretchable in the circumferential direction is held in the hosing hole 19a thus formed. Accordingly, when a rotational speed of the integrated plates 24 and 25 is changed to be different from that of the center plate 19, the spring 19 is compressed in circumferential direction by the integrated plates 24 and 25 and the center plate 19. Therefore, the torque inputted to the integrated plates 24 and 25 can be transmitted to the center plate 19 while reducing the pulsations by elasticity of the spring 26. Thus, the spring 26 serves as the elastic damper.

A sealing member 27 is interposed individually between the input side plate 24 and the center plate 19, and between the output side plate 25 and the center plate 19 in the radially outer side of the spring 26. Thus, a space A serving as the holding chamber of the present invention is formed by the sealing members 27 and the plates 24 and 25, and the space A is maintained in a dry condition by preventing the oil in the torque converter 1 from entering into the space A by the sealing members 27.

A plurality of rolling members 28 held by the center plate 19 is arranged in the space A. Specifically, a plurality of insertion holes 19b to which the rolling member 28 is inserted to be held in the space A is formed on the center plate 19 in the circumferential direction. In order to prevent an disengagement of the rolling member 28 from the insertion hole 19b, both axial end portions of the rolling member 28 are formed to have outer diameters larger than a width of the insertion hole 19b formed on the center plate 19. In other words, an intermediate portion of the rolling member 28 whose outer diameter is smaller than that of the axial end portion is inserted into the insertion hole 19b.

The insertion hole 19b has an arcuate inner face 19c on its outer circumferential side so that the rolling member 28 rolls along the inner face 19c. That is, the rolling member 28 is engaged with the center plate 19 while being allowed to rotate not only in the same direction but also relatively with the center plate 19. Specifically, the inner face 19c is formed in a manner such that a number of oscillations per rotation of the rolling member 28 is harmonized with a number of pulsations per rotation of the torque inputted to the front cover 7. To this end, the inner face 19c of the insertion hole 19b is formed in such a manner that a square root of a value obtained by dividing a distance R between an oscillation center of the rotational member 28 and a rotational center of the hub shaft 18 by a distance L between a gravity center of the rolling member 28 and the oscillation center of the rotational member 28 is conformed to a number of pulsations per rotation "n" of the torque inputted to the front cover 7, as expressed by the following expression:

$$n=\sqrt{(R/L)}.$$

Thus, in order to counteract the torque pulsations by the oscillating motion of the rolling member 28, the inner face 19c of the insertion hole 19b is formed in such a manner that a number of oscillations per rotation of the rolling member 28 is harmonized with a number of torque pulsations per rotation. However, a shape of a face being opposed to the inner face 19c is not limited to a specific configuration. As described, in order to prevent an disengagement of the rolling member 28 from the insertion hole 19b, both axial end portions of the rolling member 28 are formed to have outer diameters larger than the width of the insertion hole 19b. However, a shape of the rotary member 28 is also not limited to a specific configuration as long as being allowed to roll the insertion hole 19b. Optionally, in order to allow the rolling member 28 to oscillate along the inner face 19c of the insertion hole 19b smoothly, a surface of the rolling member 28 may be covered with resin. To this end, alternatively, it is also possible to apply grease to the outer circumferential face of the rolling member 28 or to the inner face 19c of the insertion face 19b.

A sleeve is formed on the outer circumferential lateral face of the unit of the plates 24 and 25, and a spline engaged with the sleeves is formed on the outer circumferential end of the lockup piston 21. Therefore, the lockup piston 21 and the unit of the plates 24 and 25 are allowed to rotate integrally, and the lockup piston 21 is allowed to axially reciprocate toward and away from the plates 24 and 25.

In the torque converter 1, the torque is transmitted to the front cover 7 from the drive plate, and when the lockup clutch 20 is engaged with the front cover 7, the torque of the front cover 7 is transmitted to the lockup piston 21 through the friction plate 23. Since the lockup piston 21 is splined to the unit of the input side plate 24 and output side plate 25, the power transmitted to the lockup piston 21 is further transmitted to the plates 24 and 25. Consequently, the plates 24 and 25 are rotated integrally with the lockup piston 21. Then, the torque thus transmitted to the plates 24 and 25 is further transmitted to the center plate 19 through the spring 26. In this situation, the pulsation of the torque transmitted to the plates 24 and 25 are damped by the spring 26, and the torque is further transmitted from the center plate 19 to the output shaft 14 through the hub shaft 15. As a result, the center plate 19, the hub shaft 15 and the output shaft 14 are rotated integrally. In addition, since the hub shaft 15 is attached to the turbine runner 5 by a rivet 17, the turbine runner 5 is also rotated integrally with the center plate 19.

Meanwhile, pulsations of the torque of the rotary member rotated integrally with the center plate 19, that is, pulsations of the torque transmitted through the hub shaft 15, the turbine runner 5, the output shaft 14 and a not shown transmission connected with the output shaft 14 are damped by the oscillating motion of the rolling member 28. That is, the rotary member whose vibrations are damped by the rolling member 28 includes the hub shaft 15, the turbine runner 5, the output shaft 14 and the transmission connected with the output shaft 14. Thus, members forming the space A holding the rolling member 28, that is, the input side plate 24, the output side plate 25 and the sealing member 27 are excluded from the rotary member whose vibrations are damped by the rolling member 28.

This means that a total mass of the input side plate 24, the output side plate 25 and the sealing member 27 is deducted from a mass of the rotary member whose vibrations are damped by the rolling member 28. Therefore, the mass (or mass ratio) of the rolling member 28 may be larger than that of the rotary member whose vibrations are damped by the rolling member 28. For this reason, the mass ratio is increased so that the vibration damping performance is enhanced. In addition, since the input side plate 24, the output side plate 25, the sealing member 27 and the front cover 7 are rotated integrally, the mass inputted to the spring 26 is increased. Accordingly, an inertia moment of the rotary member of the input side of the spring 26 is increased. Therefore, the input side plate 24, the output side plate 25 and the sealing member 27 are also allowed to serve as the mass damper for reducing the vibrations inputted to the spring 26. Consequently, the vibrations inputted to the rotary member can be suppressed efficiently by the rolling member 28.

In addition, since the oil is not delivered to the space A in which the rolling member 28 oscillates, the oscillating motion of the rolling member 28 will not be impaired by the viscosity of the oil. Therefore, the vibration damping performance of the rotary member 28 may be enhanced.

The present invention is applied to the hydraulic transmission comprising a driving member and driven member. Therefore, the present invention may also be applied to a hydraulic transmission comprising or a fluid coupling other than the foregoing torque converter having the torque amplifying function.

The invention claimed is:

1. A vibration damping device, which is applied to a power transmission unit having an input side rotary member that transmits a power to an elastic member and an output side rotary member that is rotated by the power transmitted from the elastic member, and that is adapted to damp vibrations of the output rotary member, comprising:
   a hydraulic transmission adapted to transmit power by a flow of fluid;
   a holding chamber bounded by a housing that is formed inside of the hydraulic transmission, the housing (1) comprising the input side rotary member which covers an outer circumferential side of the output side rotary member, and (2) being rotated relatively with the output side rotary member; and
   a rolling member that is held in the holding chamber in an outer circumferential side of the output side rotary member in a manner to oscillate in a rotational direction of the output side rotary member while being allowed to rotate relative to the output side rotary member; and
   a sealing member that is interposed between the housing and the output side rotary member to prevent entering of the fluid into the holding chamber holding the rolling member, so as to maintain the holding chamber in a dry condition,
   wherein the elastic member is disposed in an inner circumferential side of the sealing member.

2. The vibration damping device as claimed in claim 1, wherein the input side rotary member includes a lockup clutch that transmits an input torque of the hydraulic transmission mechanically to an output shaft of the hydraulic transmission.

3. The vibration damping device as claimed in claim 2, wherein the lockup clutch is engaged with the holding chamber while being allowed to reciprocate toward and away from the holding chamber.

4. The vibration damping device as claimed in claim 3,
   wherein the input side rotary member includes an input side plate and an output side plate being opposed to each other in an axial direction; and
   wherein the lockup clutch is splined at least to any of an outer circumferential face of the input side plate and an outer circumferential face of the output side plate.

5. The vibration damping device as claimed in claim 2,
   wherein the input side rotary member includes an input side plate and an output side plate being opposed to each other in an axial direction; and
   wherein the lockup clutch is splined at least to any of an outer circumferential face of the input side plate and an outer circumferential face of the output side plate.

* * * * *